United States Patent
Yokokawa et al.

[11] Patent Number: 6,084,360
[45] Date of Patent: Jul. 4, 2000

[54] DEVICE FOR OPERATION OF A DISCHARGE LAMP

[75] Inventors: Yoshihisa Yokokawa; Masaki Yoshioka; Takafumi Mizojiri, all of Himeji, Japan

[73] Assignee: Ushiodenki Kabushiki Kaisha, Tokyo, Japan

[21] Appl. No.: 09/147,051

[22] PCT Filed: Feb. 4, 1998

[86] PCT No.: PCT/JP98/00451

§ 371 Date: Sep. 25, 1998

§ 102(e) Date: Sep. 25, 1998

[87] PCT Pub. No.: WO98/35536

PCT Pub. Date: Aug. 13, 1998

[30] Foreign Application Priority Data

Feb. 5, 1997 [JP] Japan ................................ 9-022342

[51] Int. Cl.⁷ .................................................. H05B 41/16
[52] U.S. Cl. ........................ 315/287; 315/246; 315/268; 313/607
[58] Field of Search ................................... 315/246, 248, 315/294, 307, 260, 268, 287; 313/607, 637, 641, 237, 576

[56] References Cited

U.S. PATENT DOCUMENTS

| | | | |
|---|---|---|---|
| 5,444,331 | 8/1995 | Matsuno et al. | 313/553 |
| 5,581,152 | 12/1996 | Matsuno et al. | 313/634 |
| 5,604,410 | 2/1997 | Vollkommer et al. | 315/246 |
| 5,666,026 | 9/1997 | Matsuno et al. | 313/634 |
| 5,666,031 | 9/1997 | Jennato et al. | 315/246 |
| 5,757,132 | 5/1998 | Matsuno et al. | 313/607 |
| 5,936,358 | 8/1999 | Okamoto et al. | 315/248 |

FOREIGN PATENT DOCUMENTS

| | | |
|---|---|---|
| 5-74587 | 3/1993 | Japan . |
| 6-188087 | 7/1994 | Japan . |
| 7-94150 | 4/1995 | Japan . |
| 8-17403 | 1/1996 | Japan . |
| 8-31386 | 2/1996 | Japan . |
| 8-31387 | 2/1996 | Japan . |
| 8-31585 | 2/1996 | Japan . |
| 8-273863 | 10/1996 | Japan . |
| WO97/26779 | 7/1997 | WIPO . |

*Primary Examiner*—Haissa Philogene
*Attorney, Agent, or Firm*—Nixon Peabody LLP; David S. Safran

[57] ABSTRACT

A device for operation of a discharge lamp in which a dielectric barrier discharge lamp can discharge with high efficiency. A discharge lamp of the outside electrode type, a dielectric barrier discharge excimer lamp type, or the like, is operated by applying a lamp voltage of 1 kV to 10 kV with a periodic waveform by an operation circuit. In this lamp, within bulb including a dielectric, at least one type of rare gas is hermetically enclosed in a given amount. A dielectric barrier is located between at least one electrode and the gas, and a discharge is produced in the bulb via this dielectric barrier. The rise time or fall time of a waveform which represents a main energy supply time in the periodic waveform, is fixed at greater than or equal to 0.03 $\mu$s and less than or equal to 9 $\mu$s. Furthermore, the distance between the waveform which represents the main energy supply and a adjacent waveform which represents an adjacent main energy supply is greater than or equal to 3.4 $\mu$s.

9 Claims, 7 Drawing Sheets

DEVICE FOR OPERATION OF A DISCHARGE LAMP

TECHNICAL FIELD

The invention relates to a device for operation of a discharge lamp in which a bulb consisting of a dielectric is hermetically filled with at least one sort of rare gas in a stipulated amount in which via the dielectric barrier in the bulb a discharge is caused and in which thus the discharge lamp is operated.

DESCRIPTION OF RELATED ART

In a discharge lamp in which a discharge vessel consisting of a dielectric material is filled with discharge gas with a rare gas as the main component, as is recognized in the vessel an excimer emission is formed when a high frequency voltage is applied via the dielectric barrier.

Depending on which light is desired, there are lamps in which on the inside of the discharge vessel a fluorescent material is applied, and there are those in which this is not the case.

Those lamps in which fluorescent material is not applied, are commercially sold as dielectric barrier discharge lamps. In them UV (ultraviolet) radiation is emitted from at least one part of the discharge vessel via the dielectric material. They are used for UV cleaning, activation of organic materials by UV radiation and for similar purposes.

On the other hand, those lamps in which fluorescent material is applied to the inside of the discharge vessel are known as fluorescent discharge lamps of the outside electrode type. Commercial lamps of this type are used for document scanning in office automation equipment, for back light of a liquid crystal display, and for similar purposes.

The above described dielectric barrier discharge lamps (hereinafter called only "discharge lamps" when necessary) have been conventionally operated under the condition that an uninterrupted HF voltage or pulsed HF voltage is applied to their electrodes.

Under the above described operating conditions however a discharge with high efficiency is not obtained. Therefore the inventors have performed various experiments and done checks. They indicated that by operating a discharge lamp by applying a periodic voltage waveform with a steep rise and maximum peak waveform, in which the width with respect to one repetition period t is less than or equal to a given value, a stable discharge with high efficiency can be maintained.

The inventors therefore have established and shown in already filed Japanese patent application HEI 8-4499 (WO 97/26779) for the voltage FWHM (full width half maximum) to be applied to the discharge lamp that in this FWHM the steep rise of the voltage waveform is effective for this discharge lamp.

Figure 9:
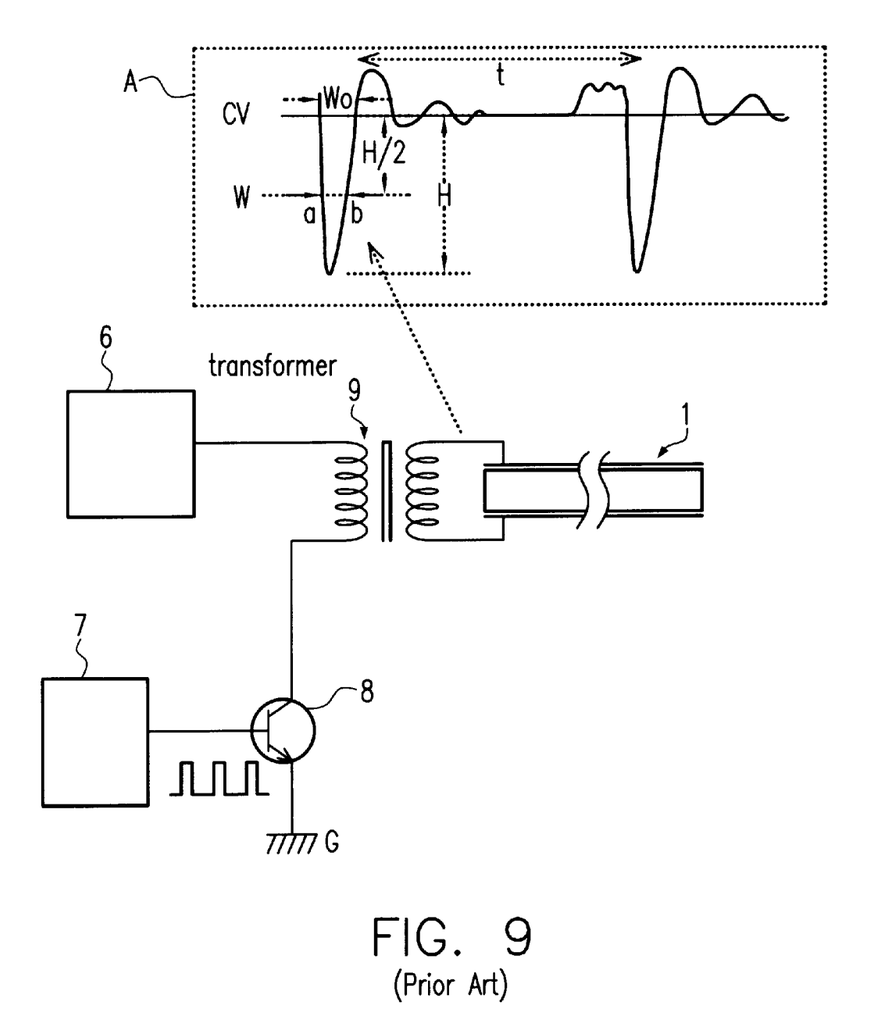
FIG. 9 shows a schematic of the arrangement of the operation circuit of a discharge lamp and the FWHM of the voltage applied to the discharge lamp.

As is illustrated in FIG. 9, in switching of switching device 8 by driver circuit 7 and when voltage is applied to discharge lamp 1 via transformer 9 it was possible to maintain a stable discharge and increase the illuminance by applying a periodic voltage waveform to discharge lamp 1 in which the FWHM W lies within a given value when the width between two points a and b is defined as FWHM W. This width has a voltage value (H/2 in the figure) which, proceeding from a position at which a waveform with maximum peak value of the voltage within the above described one period intersects voltage 0 V which has half of the maximum peak value (H in the Figure) as is illustrated in FIG. 9.

A small FWHM means a steep rise of the voltage. The smaller the FWHM became, the higher the illuminance became. Furthermore the illuminance in the above described establishment of a stipulated FWHM in a flyback operation type system was higher than in a conventional reciprocating operation type system.

As was described above, by making the FWHM smaller a higher illuminance can be obtained than in the conventional reciprocating operation type or similar operation system. Recently however it has been more and more desirable to operate a discharge lamp more efficiently.

The invention was devised based on the above described circumstances. Therefore the object of the invention was to devise a device for operating a discharge lamp in which by applying a lamp voltage with a voltage waveform which was conventionally never used, a dielectric barrier discharge lamp with high efficiency can discharge. Disclosure of the invention The above described object is achieved with consideration of the above described points as claimed in the invention by operation of a discharge lamp in the following manner:

(1) In a device for operating a discharge lamp with a lamp voltage from 1 kV to 10 kV which has a periodic waveform, in the discharge lamp within a bulb consisting of a dielectric at least one type of rare gas being hermetically enclosed in a given amount, and furthermore in the discharge lamp a dielectric barrier being located between at least one electrode and the gas and a discharge being produced in the bulb via this dielectric barrier, the rise time or fall time of the waveform which represents the main energy supply time in the above described periodic waveform is fixed at greater than or equal to 0.03 $\mu$s and less than or equal to 9 $\mu$s.

(2) In a device for operating a discharge lamp of the outside electrode type with a lamp voltage from 1 kV to 10 kV which has a periodic waveform, in the discharge lamp of the outside electrode type within a bulb consisting of a dielectric at least one type of rare gas being hermetically enclosed in a given amount, and furthermore in the discharge lamp of the outside electrode type along the axial tube direction of the outside of the above described bulb there being at least two electrodes and on the inside of the above described bulb fluorescent material being applied, the rise time or fall time of the waveform which represents the main energy supply time in the above described periodic waveform is fixed at greater than or equal to 0.03 $\mu$s and less than or equal to 9 $\mu$s.

(3) In (1) and (2), within one period or for adjacent periods of the periodic waveform the greatest distance between the waveforms which supply the above described energy is fixed at greater than or equal to 3.4 $\mu$s.

(4) In (2) the upper limit of the distance between the waveforms which supply the above described energy is fixed at 8 ms.

(5) In (1) and (2) the pressure of the rare gas added to the bulb is fixed at 80 to 760 torr.

(6) In (1) through (5) a discharge lamp is operated in which the ratio of lamp voltage E to the product between rare gas filling pressure P and discharge space section X, i.e. (E/(x.p)) is fixed as follows:

$$0.914 \leq E/(x.P) \leq 312.5 \text{ (V/cm.torr)}$$

As was described above, in the preceding report the inventors ascertained that by reducing the FWHM, i.e. by a steep rise of the voltage applied to the lamp, the illuminance can be increased.

Figure 1A:
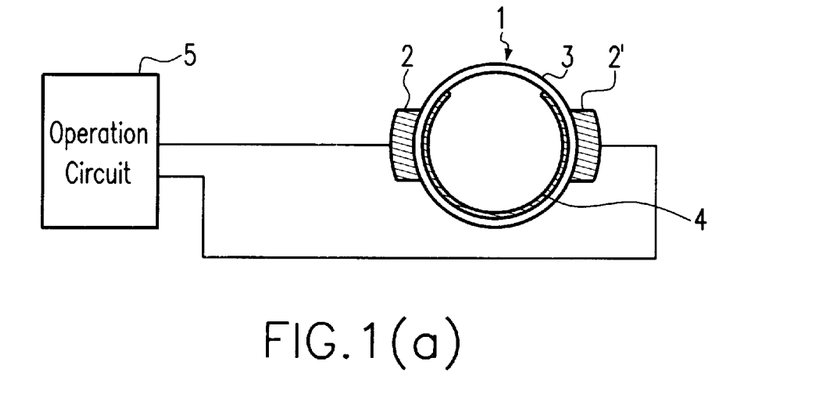
Figure 1B:
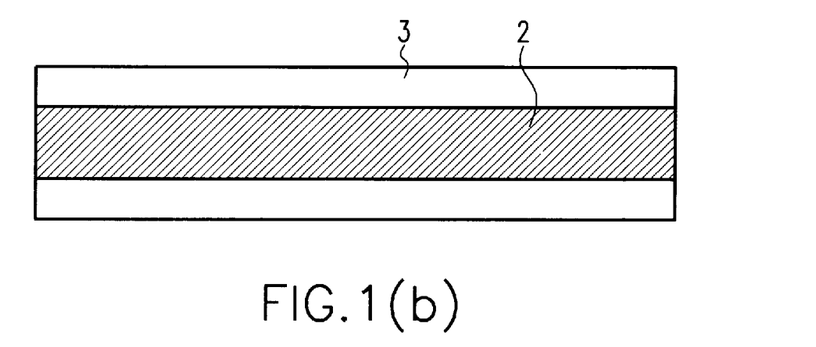
Figure 1C:
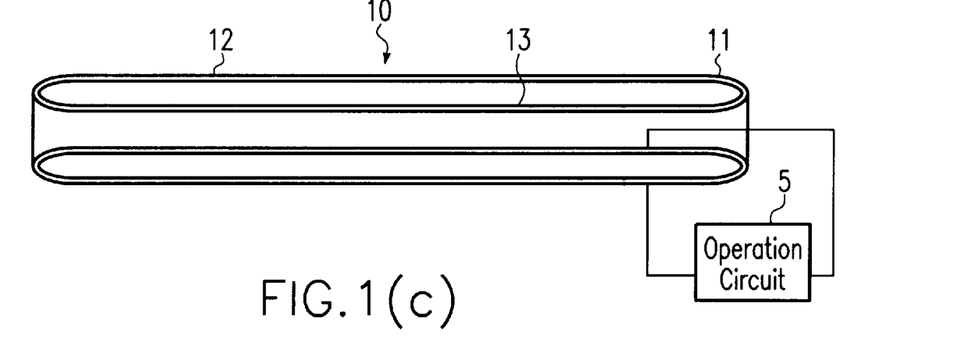

Afterwards the inventors ran various tests and experiments with respect to the dielectric barrier discharge lamps shown in FIG. 1 and found the following:

(1) It was found that in a dielectric barrier discharge lamp not only a steep rise of the voltage applied to the lamp, but also a steep drop of the waveform of the applied voltage is effective for discharge.

This is presumably due to the following.

The lamp to which the invention relates executes a dielectric barrier discharge. Here therefore the discharge gas and the electrodes execute capacitive coupling via the dielectric (coupling via a capacitor) and the power is supplied to the discharge gas via this capacitive coupling.

This means that power can be supplied to the discharge gas by applying a steep voltage change to the external electrodes. This is apparent from the following formula which represents a capacitive impedance. This means that a waveform with a steep rise and steep fall contains a plurality of frequency components in which omega is large. The larger omega becomes, the more the impedance sinks and the more easily power is supplied.

$$Z=(R^2+(1/omegaC)^2)$$

The main component of the discharge gas of the discharge lamp as claimed in the invention is xenon. When a steep voltage is applied the electrons have high energy which rises above 9 eV (minimum excitation level of the xenon), by which the xenon atoms can be excited with high efficiency. In a time interval with a small change of the lamp voltage which adjoins a steep rise or steep drop, the excited atoms by collisions with xenon atoms in the ground state produce Xe2**, immediately dissociate and produce excimer light.

Figure 2A:
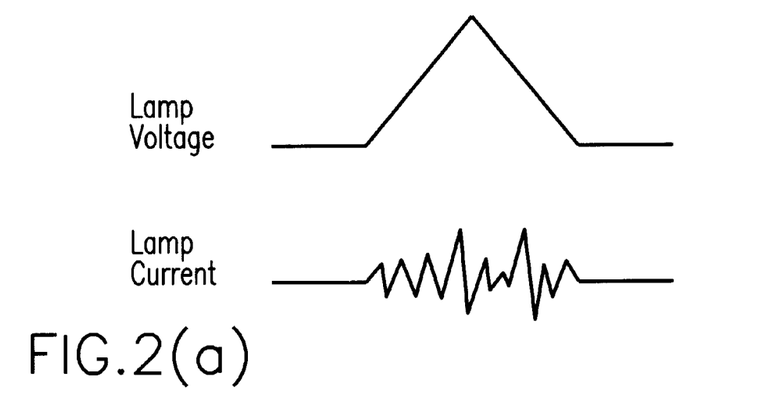
Figure 2B:
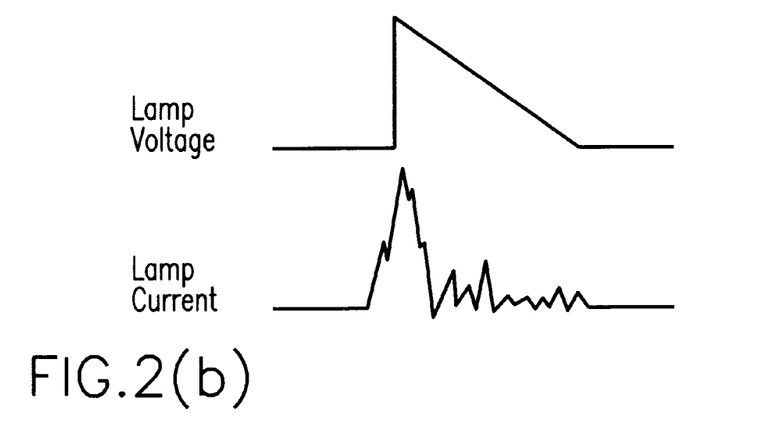
Figure 2C:
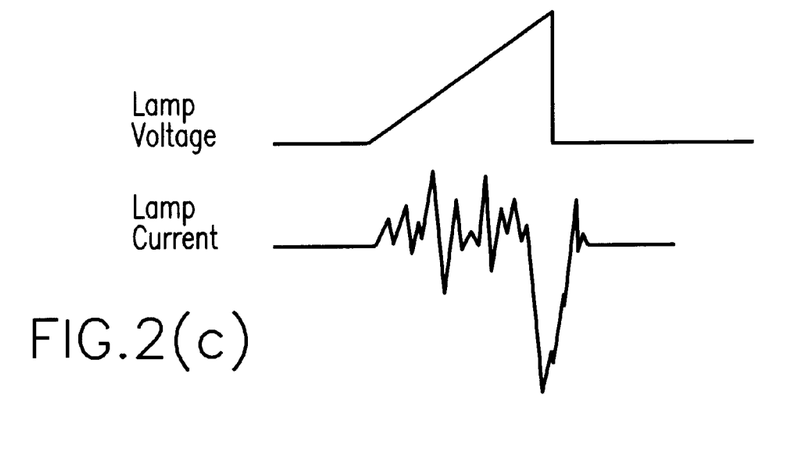

FIG. 2 shows a schematic of the waveform of the voltage applied to the discharge lamp and of the lamp current. As illustrated in FIG. 2(a), the lamp current does not increase sharply, if the rise and fall of the voltage are not steep. The lamp current however increases suddenly in the time interval in which the rise or fall of the voltage is steep, as is illustrated in FIGS. 2(b) and (c). In this time interval the main energy necessary to operate the discharge lamp is supplied to it. In the invention this time interval is called the "time interval in which the main energy is supplied in the periodic waveform".

As was described above, a steep rise and steep fall of the voltage applied to the lamp are effective for discharge. But if the above described steep rise and steep fall of the voltage for an extremely small duration occur in succession, the lamp cannot be caused to efficiently emit.

Figure 3:
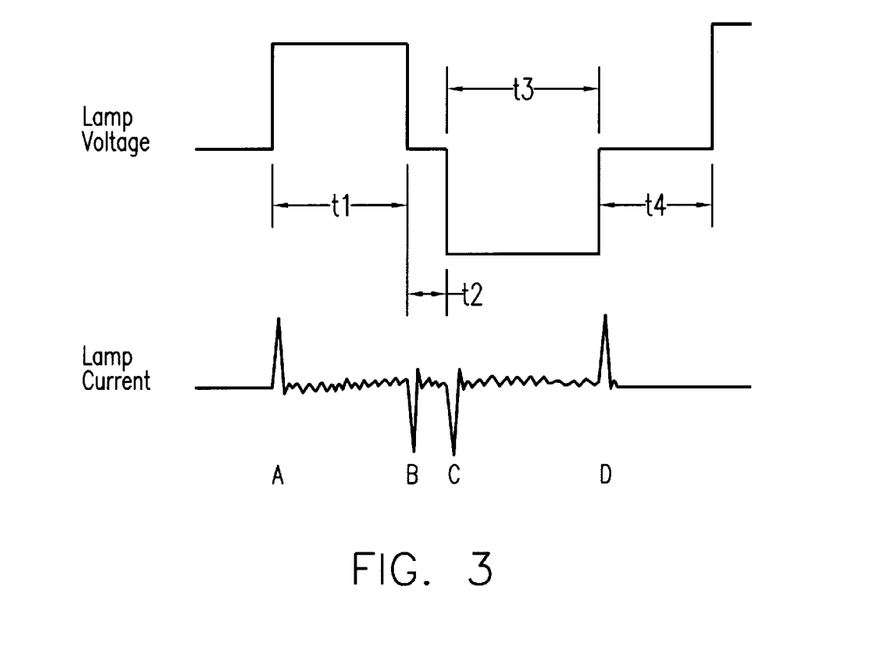
FIGS. 3 shows schematics of the relation between the voltage applied to the lamp and the excimer emission, FIGS. 4(a–d) shows schematics of the rise times and fall times in the invention.

FIG. 3 shows a schematic of the relation between the voltage applied to the lamp and excimer emission. In the figure the lamp current increases at points A, B, C, and D where the lamp voltage changes steeply, and discharges form at these points. Excimer emission takes place intensively in an after glow following these discharges. Since the discharge lamps emits in the above described after glow, the intensity of the excimer light depends on the length of time to the next discharge.

According to FIG. 3, in the case of relatively long times t1 and t4 in an after glow of discharge A and in the after glow of discharge D, excimer light is obtained. On the other hand, in the case in which subsequent to discharge B after an extremely short time t2 discharge C occurs, the excitation species of xenon produced in discharge B together with the excimer which was produced in a process of excitation of the excimer is destroyed by subsequent discharge C.

If time t3 which follows discharge C is relatively long, excimer is produced from the xenon excitation species produced by discharge C and an excimer emission is obtained.

This means that if in an extremely short time after formation of a discharge the next discharge forms, by the next discharge the generated excimer is destroyed. For emission of the discharge lamp with high efficiency it is therefore necessary to fix the time interval between the discharges, i.e. the distance between the waveforms which supply the energy necessary for emission of the discharge lamp at greater than or equal to a stipulated value. As a result of tests it became apparent that the necessary interval between the steep rise and steep fall of the voltage applied to the lamp, i.e. the required distance between the waveforms which supply the energy necessary for discharge of the discharge lamp, must be greater than or equal to 3.4 μs, as is described below.

The 80% afterglow time of the fluorescent material (RGB) used at present for B (blue) is less than or equal to roughly 1 μs, for G (green) less than or equal to roughly 8 milliseconds, and for R (red) less than or equal to roughly 2 milliseconds.

For continuous emission of the G light (green) often used for copy machines and the like, in a fluorescent discharge lamp of the outside electrode type in which on the inside of the discharge vessel a fluorescent material is applied, it is therefore necessary to fix the distance between the waveforms which supply the energy necessary for emission of the above described discharge lamp at less than or equal to 8 ms.

(2) As was described above, the discharge lamp can be caused to emit with high efficiency by applying the voltage waveforms with steep rises and falls with time intervals which are greater than or equal to a stipulated value to the discharge lamp. As a result of various tests and experiments however it became apparent that the discharge lamp cannot emit with high efficiency when the above described rise times and fall times are too long or too short.

In this case the "rise time" and "fall time" in the invention are described as follows:

(1) Rise Time

Figure 4A:
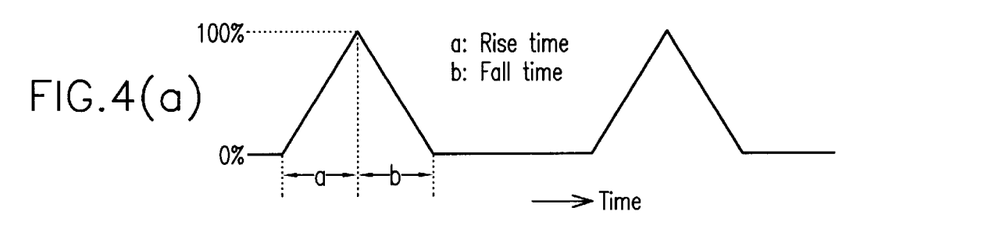
Figure 4B:
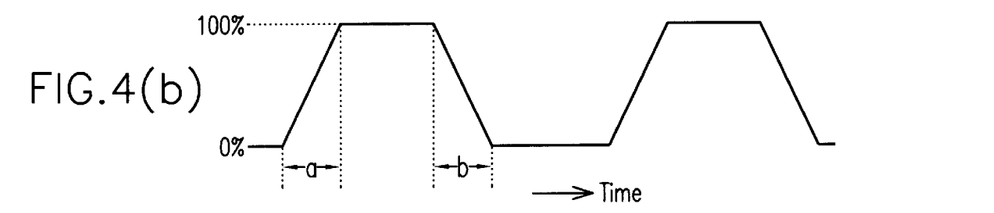
Figure 4C:
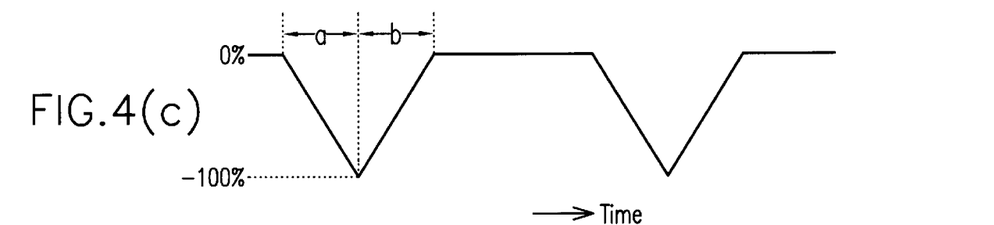
Figure 4D:
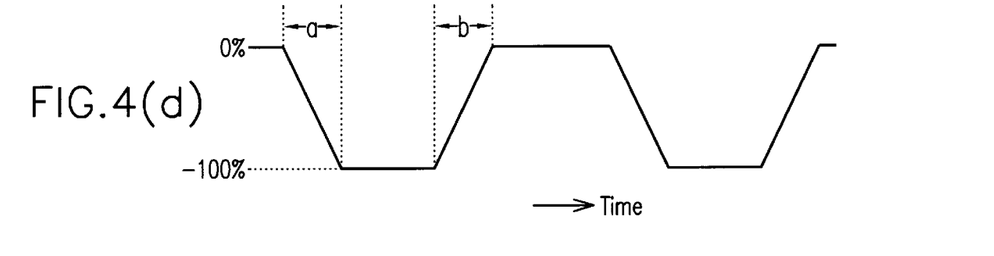

In the voltage waveforms in FIGS. 4(a) and (b) time a in which a voltage of 0% reaches a voltage of roughly 100% is defined as the rise time. In the case of a negative property of the voltage waveforms as shown in FIGS. 4(c) and (d), time a in which a voltage of 0% reaches a negative voltage of roughly −100% is likewise defined as the rise time.

(2) Fall Time

In the voltage waveforms in FIGS. 4(a) and (b) time b in which a voltage of roughly 100% reaches a voltage of 0% is defined as the fall time. In the case of a negative property of the voltage waveforms as shown in FIGS. 4(c) and (d), time b in which a negative voltage of roughly −100% reaches a voltage of 0% is likewise defined as the fall time.

The reason why the discharge lamp cannot emit with high efficiency in an overly long rise time is presumably the following:

In the stages in which the electron energy within the lamp has a peak and high speed rises are present, the electrons are accelerated by the electrical field. The electron energy increases by collisions with the xenon atoms and the like, the generation of the excimer also increasing. The radiant efficiency of the vacuum UV emission therefore increases.

If however the voltage continues in the rising condition after the peak of electron energy has been exceeded, the frequency of collisions and recombination with ions which were produced by the electrons accelerating over time and by the discharge increase. In this way the electron energy is suppressed. Furthermore the radiant efficiency of the UV radiation is reduced by the generated excimer being destroyed by the ions and electrons.

Experiments showed that the upper limit of the above described rise time and fall time is roughly 9 μs, as is described below.

Next, a test was run with respect to the lower limit of the above described rise time and fall time. As is described below, in a lamp with a tube diameter of 8 mm the phenomenon can be observed that under the condition of the rise time of the lamp of 0.03 μs the tube ends of the lamp do not discharge. This is not entirely clarified. But the following can be imagined.

In the vicinity of the tube ends the voltage is not uniform and the field intensity is weaker than in the vicinity of the middle. In the case of a voltage with high speed rises therefore the discharge is maintained, but cases occur in which sufficient acceleration of the electrons (increase of electron energy) is not enabled. If on the one hand it happens that a discharge does not occur, only the lamp voltage is supplied to this area and the ignition voltage is not reached. The area which does not discharge therefore does not return to the original state.

In the same lamp under the condition of a rise time of 0.1 μs of the lamp voltage the above described phenomenon cannot be observed, Therefore it can be stated that the desired rise time is greater than or equal to 0.03 μs.

BRIEF DESCRIPTION OF THE DRAWING

FIGS. 1(a–c) shows schematics of the arrangements of discharge lamps which were used in one embodiment of the invention, FIGS. 2(a–c) shows schematics of the voltage waveforms applied to the discharge lamp and the lamp currents.

FIGS. 8(a–c) shows schematics of the arrangements of other discharge lamps to which the invention is applied.

BEST MODE FOR CARRYING OUT THE INVENTION

FIG. 1 shows schematics of the arrangements of discharge lamps which were used in one embodiment of the invention. FIG. 1(a) shows a fluorescent discharge lamp of the outside electrode type in a direction perpendicular to the tube axis direction in cross section. FIG. 1(b) shows a side view thereof. FIG. 1(c) is a schematic of a dielectric barrier discharge excimer lamp with a hollow cylindrical shape.

Reference number 1 labels a fluorescent discharge lamp of the outside electrode type which consists of discharge vessel (bulb) 3 of a dielectric such as glass or the like, a pair of strip-shaped or line-shaped electrodes 2, 2' and layer 4 of fluorescent material, as is illustrated in FIGS. 1(a) and (b).

Discharge vessel (bulb) 3 is filled with rare gas with xenon as the main component. Electrodes 2, 2' on the side in the tube axis direction of discharge vessel (bulb) 3 are located essentially over the entire length and consist of aluminum or the like. Layer 4 of fluorescent material is formed on the inside of discharge vessel 3.

Operation circuit 5 is connected to one pair of electrodes 2, 2' of fluorescent discharge lamp of outside electrode type 1. A lamp voltage with a periodic waveform is applied to electrodes 2, 2'. In this way in the discharge space within discharge vessel 3 present between external electrodes 2 and 2' the voltage is applied via the side of discharge vessel 3, causing a discharge and the lamp to emit.

On the other hand dielectric barrier discharge excimer lamp 10 with a hollow cylindrical shape consists of hollow cylindrical discharge vessel (bulb) 11 of quartz glass, metal net electrode 12 and metallic electrode 13 as is illustrated in FIG. 1(c). Discharge vessel (bulb) 11 is filled with rare gas with xenon as the main component. Metal net electrode 12 is located on the outside periphery of discharge vessel 11 and metallic electrode 13 is located on the inside of the hollow cylinder.

Operation circuit 5 is connected to metal net electrode 12 and metallic electrode 13 of lamp 10 and a lamp voltage with the same periodic waveform as the above described periodic waveform is applied. In this way in the discharge space within discharge vessel 3 present between outside electrodes 2 and 2' the voltage is applied via the side of discharge vessel 3, causing a discharge and the lamp to emit.

The voltage applied to discharge lamps 1, 10 by operation circuit 5 is, as described above, a periodic waveform voltage which has a rise or a fall time of the waveform of greater than or equal to 0.03 μs and less than or equal to 9 μs which represents the main energy supply time, and the greatest distance between these waveforms of greater than or equal to 3.4 μs. By applying this voltage with the periodic voltage waveform, fluorescent discharge lamp of the outside electrode type 1 and dielectric barrier discharge excimer lamp 10 with a hollow cylindrical shape can emit with high efficiency.

In the case of continuous emission of G-light (green) in fluorescent discharge lamp of the outside electrode type 1 shown in FIGS. 1(a) and (b), as was described above, the upper limit of the distance between the waveforms which represents the above described main energy supply time is set to 8 ms.

Figure 5:
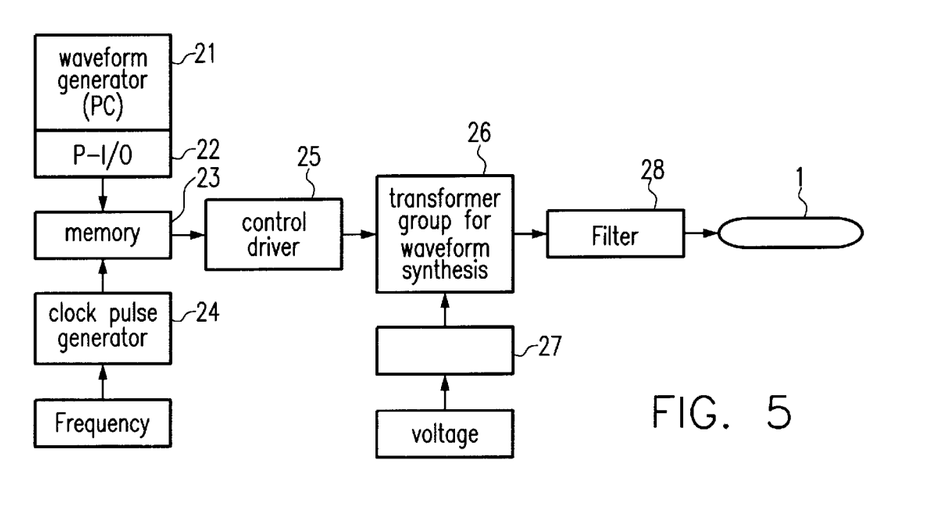
FIG. 5 shows a schematic of the arrangement of an operation circuit which was used in this embodiment, FIGS. 6(a–b) shows a schematic of the relation between the rise time and the fall times and illuminance efficiency.

FIG. 5 shows a schematic of the arrangement of the operation circuit which was used in this embodiment. In the figure the operation circuit is shown in an example in which the waveform of the applied voltage can be controlled to operate the discharge lamp under altered conditions.

In the figure, reference number 21 labels a waveform generator which consists of a PC or the like. Furthermore reference number 22 labels an input-output part and reference number 23 a memory. Waveform generator 21 produces the waveform which is applied to the discharge lamp and which is stored in memory 23 via input-output device 22.

The waveform data stored in memory 23 are synchronized with a clock pulse with a given frequency which is output by clock pulse generator 24, read out and sent to control driver 25.

Furthermore reference number 26 labels a transformer group for waveform synthesis which consists of several transformers and to which a direct current from direct current source 27 is supplied. Transformer group 26 for waveform synthesis generates according to the output of driver 25 a voltage with a periodic waveform which was produced by waveform generator 21. This voltage is applied via filter 28 to discharge lamp 1.

FIG. 5 shows the operation circuit on an example in which the waveform of the voltage to be applied can be controlled. As the operation circuit however other known circuits can be used, such as for example an operation circuit of the flyback type shown above using FIG. 9.

In the case of using the operation circuit shown in FIG. 9, by suitable selection of the inductance of transformer 9 in FIG. 9, the voltage of the drive power source, the pulse spacing of the driver signals and the like, the rise and fall time in the periodic waveform, the distance between the waveforms and the like can be set to desired values.

In this embodiment, using the operation circuit shown in FIG. 5 and the operation circuit of the flyback type shown in FIG. 9, the waveform of the voltage applied to the discharge lamp was changed and the relation between the rise and fall time of the voltage and the illuminance efficiency (illuminance/lamp power (1 x/W)) and the relation between the distance between the waveforms of the voltage applied to the discharge lamp and the illuminance efficiency (illuminance/lamp power (1 x/W)) were checked. The test conditions are as follows:

(1) Operating Conditions
Lamp voltage: −3 kVo-p
Operation frequency: 10 kHz fixed
Waveform width: 30 $\mu$s (width of crossing with a waveform of 0 V)
(2) Specification of the lamp used for the tests
Tube diameter: discharge lamp with a diameter of 8.0 mm and one pair of outside electrodes
Lamp length: 360 mm
Added gas: rare gas with xenon Xe as the main component
Fill pressure: 120 torr The value of the upper limit of the rise time and fall time was determined in the test described below.

Using the operation circuit shown in FIG. 5 waveform manipulator 21 was actuated and the voltage triangle waveform shown above using FIG. 2 was generated and applied to discharge lamp 1. Thus discharge lamp 1 was operated. The illuminance and the lamp power supplied to discharge lamp 1 were measured in doing so.

This measurement was taken by changes of the slopes of the rises and falls of the waveform and by changes of the rise time and the fall time of the waveform, by which the relation between the rise and fall times and the illuminance intensity was determined.

Figure 6A:
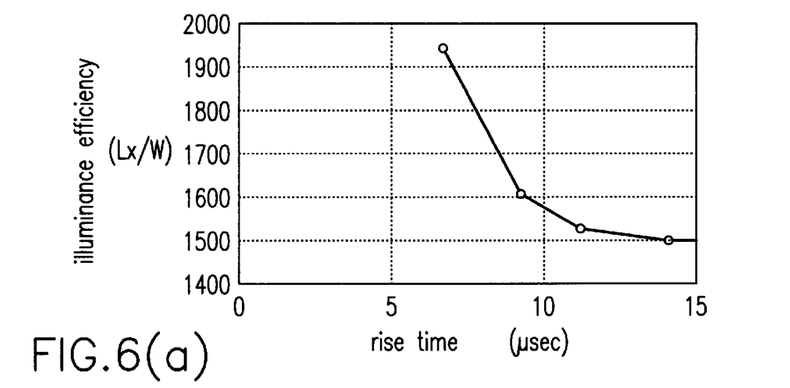
Figure 6B:
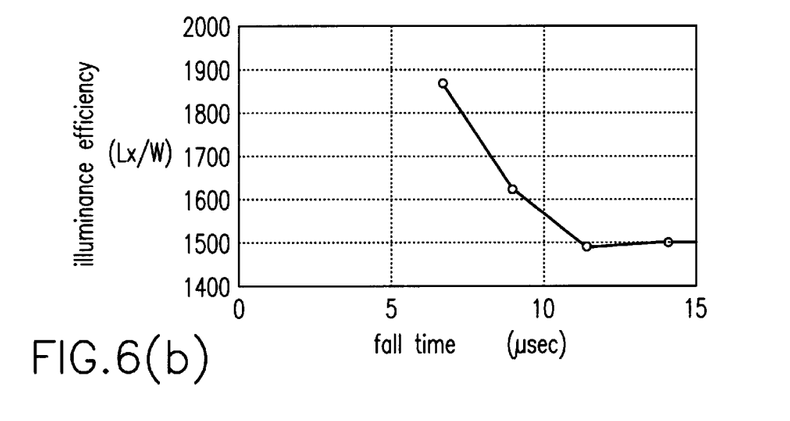

FIG. 6 shows schematics of the relations obtained in this way between the rise and fall times and the illuminance intensity. FIG. 6(*a*) shows the relation between the rise time and the illuminance intensity, while FIG. 6(*b*) shows the relation between the fall time and the illuminance intensity.

As is apparent from the drawings, the illuminance intensity dropped when the rise time and the fall time exceeded 9 $\mu$s. This showed that the upper limit of the rise time and the fall time of the voltage applied to the discharge lamp is 9 $\mu$s.

To determine the value of the lower limit of the rise time and fall time the experiment described below was run.

In doing so the operation circuit of the flyback type shown in FIG. 9 was used because in the operation circuit shown in FIG. 5 a fast rise of the pulse cannot be accomplished. The stray capacity of the secondary winding of transformer 9 was reduced and a steep rise of the pulse which was applied to the discharge lamp was obtained. In this way the value of the lower limit was determined.

As a result the tube end of the discharge lamp became dark when the rise time exceeded 0.03 $\mu$s. This showed that the lower limit of the rise and fall time of the voltage applied to the discharge lamp is 0.03 $\mu$s.

Next, under the above described test conditions and using the operation circuit shown in FIG. 5, the relation between the distance between the rising waveform and the falling waveform and the illuminance was studied in the manner described below.

Waveform manipulator 21 of the operation circuit shown in FIG. 5 produced a rectangular waveform which was applied to discharge lamp 1. Discharge lamp 1 was operated and measurement of the illuminance and lamp voltage was done. Only the distance between the above described waveforms was changed and thus the relation between the distance between the waveforms and illuminance was studied.

Figure 7:
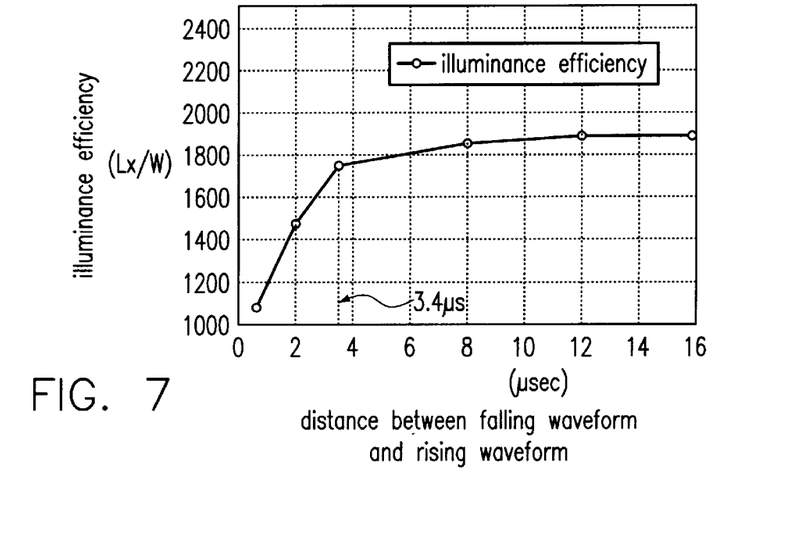
FIG. 7 shows a schematic of the relation between the illuminance efficiency and the distance between the rising waveform and the falling waveform.

FIG. 7 is a schematic of the relation obtained in the above described manner between the illuminance efficiency and the distance between the rising waveform and the falling waveform and the illuminance. The figure shows the result, the speed of rises and falls having been made essentially constant, a voltage with a width (width of crossing with 0 V) of 1.6 $\mu$s was applied and the distance therefrom was changed.

As the drawing shows, the illuminance efficiency decreases when the distance between the above described waveforms is less than or equal to 3.4 $\mu$s. This showed that the value of the lower limit of the distance between the above described waveforms is 3.4 $\mu$s.

A discharge lamp with a fill pressure of 120 torr was used in this test. However the fill pressure of the rare gas filling the discharge lamp can be arbitrarily chosen in the range from 80 torr to 760 torr.

As above described Japanese patent application HEI 8-4499 shows, during operation using the conventional sine curve HF voltage the relative luminance fluctuation increases rapidly when the xenon gas partial pressure is less than or equal to 100 torr. In the case of operation as claimed in the invention, by applying a voltage with steep rises and falls to the dielectric barrier discharge lamp however the relative luminance fluctuation does not change even when the Xe partial pressure rises. Therefore as claimed in the invention the operating state can be stably maintained even if the pressure of the rare gas filling the bulb is greater than or equal to 80 torr.

When the pressure of the rare gas filling the discharge lamp is greater than or equal to 760 torr, it is difficult to seal the discharge lamp. It is therefore desirable to fix the value of the upper limit of the added gas to less than or equal to 760 torr.

In the above described test the voltage applied to the lamp was fixed at −3 kVo-p. However conventionally a voltage in the range from 1000 V to 10000 V is applied to the lamp. It is conceivable that using an arbitrary voltage within this range the same effect can be obtained.

As was described above, as claimed in the invention a discharge lamp can be used with a gas filling pressure of 80 to 760 torr and the applied voltage can be in the range from 1000 V to 10000 V.

If therefore a lamp voltage of 1000 V is applied to a lamp with a diameter of 15 mm, a thickness of the discharge vessel of 0.3 mm and a long discharge gap (discharge space gap of 14.4 mm) i.e. the minimum value, and when the pressure of the added gas is selected to be 760 torr, the value of E/xP can be computed as follows:

$$E/xP = 1000/(1.44 \times 760) = 0.914.$$

If lamp voltage of 10000 V is applied to a lamp with a diameter of 6 mm, a thickness of the discharge vessel of 1.0 mm and a short discharge gap (discharge space gap of 4 mm), i.e., the maximum value, and when the pressure of the added gas is selected to be 80 torr, the value of E/xP can be computed as follows:

E/xP=10000/(0.4×80)=321.5.

The above described experiment was run in fluorescent discharge lamp of outside electrode type 1 shown in FIGS. 1(*a*) and (*b*). It is however conceivable that therefore in dielectric barrier discharge excimer lamp 10 shown in FIG. 1(*c*) with a hollow cylindrical shape under the same operating conditions the same effect can be obtained.

The operating conditions of the fluorescent discharge lamp of the outside electrode type shown in FIGS. 1(*a*) through (*c*) and the dielectric barrier discharge excimer lamp with a hollow cylindrical shape were described above. But the invention is not limited to these discharge lamps, but can also be used for discharge lamps which are shown in FIGS. 8(*a*) through (*c*) for example.

Figure 8A:
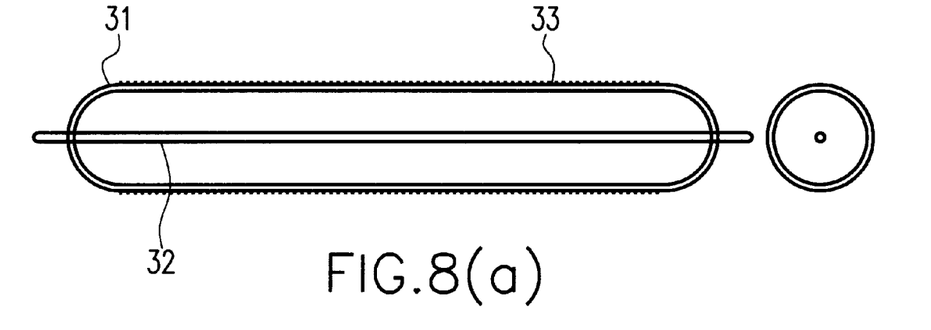

FIG. 8(*a*) shows a discharge lamp in which within discharge vessel 31 of glass or the like there is metal rod 32 which forms an electrode on the high voltage side, and in which in the outside periphery of the discharge vessel there is an electrode on the low voltage side.

Figure 8B:
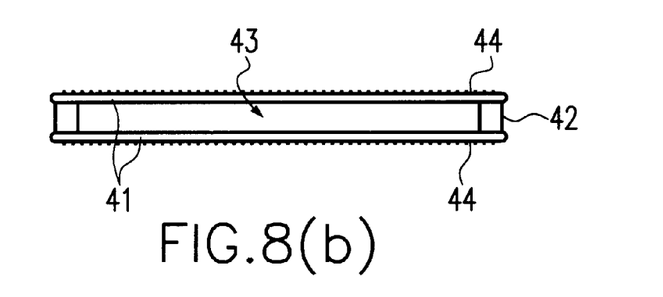

FIG. 8(*b*) shows a discharge lamp in which on both sides of a discharge vessel there is outer electrode 44, the discharge vessel consisting of two plate-like dielectrics 41 of glass and ceramic and of frame 42.

Figure 8C:
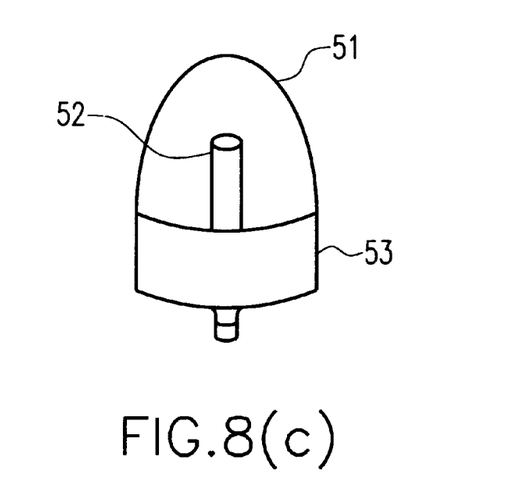

FIG. 8(*c*) shows a discharge lamp in which within a hemispherical discharge vessel 51 on its inside of glass or the like fluorescent material is applied, there is metal rod 52 which forms an electrode on the HF side and in which on the outside of discharge vessel 51 there is outer electrode 53 which forms a low voltage electrode.

As was described above, as claimed in the invention the following effects can be achieved:

(1) The discharge lamp can be operated with high efficiency by the measure that the rise time or fall time of the waveform which represents the main energy supply time for the periodic waveform, is greater than or equal to 0.03 µs and less than or equal to 9 µs, when a discharge lamp is operated with a lamp voltage from 1 kV to 10 kV which has a periodic waveform, in the discharge lamp within a bulb consisting of a dielectric a sort of rare gas being hermetically sealed in a given amount, and furthermore in the discharge lamp between at least one electrode and the gas there being a dielectric barrier and via this dielectric barrier in the bulb a discharge being produced.

(2) A discharge lamp of the outer electrode type can be operated with high efficiency by the measure that the rise time or fall time of the waveform which represents the main energy supply time for the periodic waveform is greater than or equal to 0.03 µs and less than or equal to 9 µs, when a discharge lamp of the outside electrode type is operated with a lamp voltage from 1 kV to 10 kV which has a periodic waveform, in the discharge lamp of the outside electrode type within a bulb consisting of a dielectric a sort of rare gas being hermetically sealed in a given amount, and furthermore in the discharge lamp of the outside electrode type along the tube axis direction of the outside of the above described bulb there being at least two electrodes and on the inside of the above described bulb a fluorescent material being applied.

(3) By the measure that within one period or for adjacent periods of the periodic waveform the largest distance between the waveforms which supply the above described energy is less than or equal to 3.4 µs, the discharge lamp can be operated with high efficiency without destroying the produced excitation species of xenon together with the excimer which was produced in the process of producing the excimer by the subsequent discharge.

(4) By the measure that the upper limit of the distance between the waveforms which supply the above described energy is 8 ms, the G-light (green) which is often used in copy machines and the like, can be continuously emitted.

Commercial Application

As was described above, the device as claimed in the invention for operating a discharge lamp can be used for document scanning in an office automation device, for back light of a liquid crystal display, and for similar purposes.

What we claim is:

1. A device for operating a discharge lamp with a lamp voltage from 1 kV to 10 kV which has a periodic waveform, in the discharge lamp, within a bulb consisting of a dielectric, at least one type of rare gas being hermetically enclosed in a given amount, and furthermore in the discharge lamp, a dielectric barrier being located between at least one electrode and the gas and a discharge being produced in the bulb via this dielectric barrier, characterized in that the rise time or fall time of the waveform which represents a main energy supply time in said periodic waveform is greater than or equal to 0.03 µs and less than or equal to 9 µs.

2. The device for operating a discharge lamp as claimed in claim 1, wherein the distance between the waveform which represents the main energy supply and an adjacent waveform which represents an adjacent main energy supply is greater than or equal to 3.4 µs.

3. The device for operating a discharge lamp as claimed in claim 1, wherein the pressure of the rare gas added to the bulb is 80 to 760 torr.

4. The device for operating a discharge lamp as claimed in claim 1, wherein the discharge lamp is operated in which the ratio of lamp voltage E to the product between rare gas filling pressure P and discharge space gap X, i.e. (E/(x.p)) is fixed as follows:

0.914≦E/(x.P)≦312.5 (V/cm.torr).

5. A device for operating a discharge lamp of the outside electrode type with a lamp voltage from 1 kV to 10 kV which has a periodic waveform, in the discharge lamp of the outside electrode type, within a bulb consisting of a dielectric, at least one type of rare gas being hermetically enclosed in a given amount, and furthermore in the discharge lamp of the outside electrode type, along the axial tube direction of the outside of the bulb, there being at least two electrodes and on the inside of said bulb fluorescent material being applied, wherein the rise time or fall time of the waveform which represents a main energy supply time in the periodic waveform is greater than or equal to 0.03 µs and less than or equal to 9 µs.

6. The device for operating a discharge lamp as claimed in claim 5, wherein the distance between the waveform which represents the main energy supply and an adjacent waveform which represents an adjacent main energy supply is greater than or equal to 3.4 μs.

7. The device for operating a discharge lamp as claimed in claim 5, wherein an upper limit of the distance between the waveform which represents the main energy supply and an adjacent waveform which represents an adjacent main energy supply is 8 ms.

8. The device for operating a discharge lamp as claimed in claim 5, wherein the pressure of the rare gas added to the bulb is 80 to 760 torr.

9. The device for operating a discharge lamp as claimed in claim 5, wherein the discharge lamp is operated in which the ratio of lamp voltage E to the product between rare gas filling pressure P and discharge space gap X, i.e. (L/(x.p)) is fixed as follows:

$$0.914 \leq E/(x.P) \leq 312.5 \text{ (V/cm.torr)}.$$

* * * * *